United States Patent Office 3,501,480
Patented Mar. 17, 1970

3,501,480
POLYCYCLIC ISOQUINOLYL OXADIAZOLES AND AMIDOXIME ESTERS
Leslie G. Humber, Dollard des Ormeaux, Quebec, and Martin A. Davis, Montreal, Quebec, Canada, assignors to American Home Products Corporation, New York, N.Y., a corporation of Delaware
No Drawing. Filed July 18, 1967, Ser. No. 654,070
Int. Cl. C07d 35/34
U.S. Cl. 260—287         22 Claims

ABSTRACT OF THE DISCLOSURE

There are disclosed herein the compounds 5-methyl-, 5-ethyl-, 5-propyl-, 5-phenyl-, 5-(4-chlorophenyl)-, 5-(4-fluorophenyl)-, 5-(3-methoxyphenyl)-, 5-(3,4-dimethoxyphenyl)-, 5-(4-methylphenyl), and 5-(4-ethylphenyl)-3-(7,8 - dihydrobenzo[1,2]cyclohepta[3,4,5-d,e]-isoquinolyl-3)-1,2,4-oxadiazoles and the intermediates O-acetate, O-propionate, O-butyrate, O-benzoate, O-(4-chlorobenzoate), O-(4-fluorobenozate), O-(3-methoxybenzoate), O-(3,4-dimethoxybenzoate), O-(4-methylbenzoate), and O-(4-ethylbenzoate) of 7,8-dihydrobenzo[1,2]cyclohepta-[3,4,5-d,e]-isoquinolyl-3-amidoximes. The compounds are useful as antibacterial and antifungal agents and methods for their preparation and use are also given.

---

This invention relates to polycyclic isoquinolyl oxidiazole derivatives which contain the 7,8-dihydrobenzo[1,2]-cyclohepta[3,4,5-d,e]isoquinoline nucleus and the 1,2,4-oxadiazole nucleus and which may be represented by generic structural Formula I:

(I)

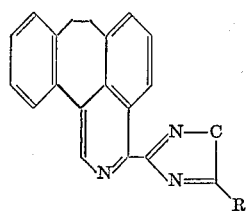

wherein R may be a lower alkyl group containing from 1–3 carbon atoms, a phenyl group, or a phenyl group substituted with halogen, lower alkoxy, or lower alkyl groups.

The compounds of Formula I are basic in nature and thus form salts with hydrogen acids. Such salts with pharmacologically acceptable acids, and the corresponding free bases of Formula I, possess useful biological properties, and this invention also relates to formulations for such biological uses. Thus, the compounds of Formula I are useful as antibacterial agents and as antifungal agents. As antibacterial agents they are effective against certain gram-positive and gram-negative organisms such as, for example, *Staphylococcus pyogenes* (both pencillin-sensitive and penicillin-resistant strains), *Sarcina lutea*, *Streptococcus faecalis*, *Escherichia coli*, *Salmonella pullorum*, *Proteus vulgaris*, and *Proteus mirabilis*. They may be used in ointments, creams, or lotions containing from 0.1–1.0 percent of the active ingredient for topical application.

As antifungal agents, the compounds of this invention are effective against pathogenic fungi such as, for example, *Candiba albicanas*, *Microsporum gypseum* and *Trichophyton granulosum* and for these uses, they may be formulated as creams, lotions or ointments, for topical application, containing from 0.5–2.0 percent of the active ingredient.

This invention also relates to a process for the preparation of the biologically active compounds of Formula I, and to the intermediates obtained in such process. The starting material may be obtained as described in our copending U.S. patent application, Ser. No. 555,674, filed June 7, 1966, now U.S. 3,403,155 granted Sept. 24, 1968. Thus, 7,8 - dihydrobenzo[1,2]cyclohepta[3,4,5 - d,e]iso-quinoline, described in the Journal of Heterocyclic Chemistry, volume 3, page 247, 1966, is treated with para-toluenesulfonylchloride and potassium cyanide to yield 2-para - toluenesulfonyl - 3-cyano-2,3,7,8-tetrahydrobenzo [1,2]cyclohepta[3,4,5-d,e]isoquinoline, which on treatment with sodium hydride gives the starting material of Formula II for this process, 3-cyano-7,8-dihydrobenzo-[1,2]cyclohepta[3,4,5-d,e]isoquinoline.

The compound of Formula II is treated with hydroxylamine hydrochloride and an acid scavenging agent such as, for example, an alkali metal hydroxide, or, an alkali metal alkoxide containing from one to six carbon atoms, in a suitable solvent, such solvents including alcohols of from one to six carbon atoms. This treatment results in the formation of 7,8-dihydrobenzo[1,2]cyclohepta[3,4,5-d,e]isoquinolyl-3-amidoxime (III). The intermediate amidoxime derivative of Formula III is subsequently condensed with a compound of the formula R—CO—X, wherein R is as defined above, and X represents a halogen atom or an acyloxy group, to form the acyl amidoxime derivative of Formula IV. This condensation is effected in the presence of a solvent and of an acid scavenging agent such as, for example, pyridine. An excess of the acid scavenging agent may serve as the solvent, or alternatively, the solvent may be an inert aromatic hydrocarbon such as, for example, benzene, toluene, xylene, or the like.

The compounds of Formula IV are converted to those of Formula I by removal of water. This dehydration may be accomplished by heating the compound to a temperature in the range of 80° C. to 200° C. Optionally, a solvent may be used. Such suitable solvents include inert aromatic hydrocarbons of the types cited above.

The compounds of Formula I, so prepared, may be transformed to their salts with pharmacologically acceptable acids by treatment with such acids in manners well-known to those versed in the art.

The following formulae, in which R has the significance described above, and examples will illustrate this invention.

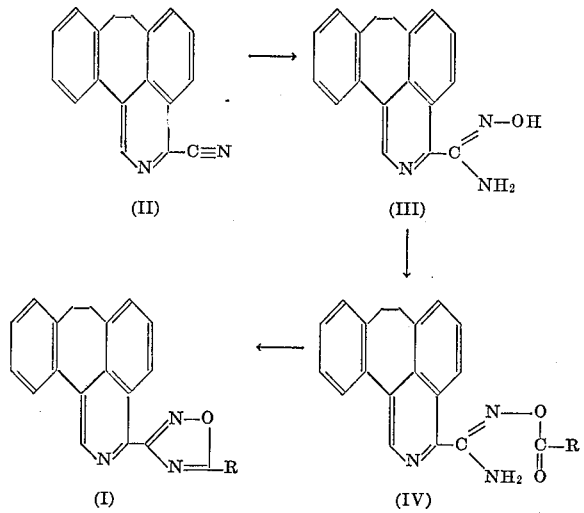

EXAMPLE 1

7,8-dihydrobenzo[1,2]cyclohepta[3,4,5-d,e] isoquinolyl-3-amidoxime

The free base of hydroxylamine hydrochloride (2.24 g., 0.032 mole) is prepared by adding the equivalent amount of sodium methoxide to the salt dissolved in 70 ml. of methanol. The precipitated sodium chloride is filtered on Celite and washed with methanol. 3-cyano-7,8-dihydrobenzo[1,2]cyclohepta[3,4,5-d,e]isoquinoline (7.2 g., 0.028 mole) is added to the combined filtrate with stirring. On refluxing the cyano compound goes into solution. After one-half hour a brown precipitate appears. Refluxing is continued for another hour and the mixture is allowed to stand overnight. The title compounds is obtained by filtration with M.P. 210–211° C. after crystallization from methanol. The hydrochloride salt is obtained with M.P. 205–208° C. Both compounds are also identified by elemental analysis.

EXAMPLE 2

7,8-dihydrobenzo[1,2]cyclohepta[3,4,5-d,e]isoquinolyl-3-amidozine-O-acetate

Acetic anhydride (1.5 ml.) is added dropwise to a solution of 7,8 - dihydrobenzo[1,2]cyclohepta[3,4,5-d,e]isoquinolyl-3-amidoxime (4.35 g., 0.015 mole) and pyridine (22.5 ml.). The mixture is heated at 65° C. for fifteen minutes. After evaporation in vacuo, the syrupy residue is treated with water to give the title compound with M.P. 160–161° C. after crystallization from zenzene, also identified by elemental analysis and by $\nu_{max.}^{CHCl_3}$ 3530, 3410, 1758, 1636 cm.$^{-1}$ In the same manner, by using propionic or butyric anhydride or chloride instead of acetic anhydrides, the O-propionate and O-butyrate of 7,8-dihydrobenzo[1,2]cyclohepta[3,4,5-d,e]-isoquinolyl - 3 - amidoxime are also obtained.

EXAMPLE 3

7,8-dihydrobenzo[1,2]cyclohepta[3,4,5-d,e]isoquinolyl-3-amidoxime-O-benzoate

Benzoyl chloride (0.35 g., 0.0025 mole) is added dropwise to a cooled solution of 7,8-dihydrobenzo[1,2]cyclohepta[3,4,5-d,e]isoquinolyl-3-amidoxime (0.73 g., 0.0025 mole) dissolved in 3.75 ml. pyridine with stirring. A white precipitate appears. The reaction mixture is left overnight at room temperature. It is poured onto ice, the precipitate is filtered and dried to give from benzene-hexane mixture an analytical sample melting at 186–187° C.

The title compound with M.P. 186–187° C. after crystallization from benzene-hexane also identified by elemental analysis and by $\nu_{max.}^{CHCl_3}$ 3600, 3490, 1738, 1635 cm.$^{-1}$ In the same manner, by using 4-chloro-, 4-fluoro-, 3-methoxy-, 3,4-dimethoxy-, 4-methyl-, or 4-ethylbenzoyl chloride instead of benzoyl chloride, the O-(4-chlorobenzoate), O-(4-fluorobenzoate), O-(3-methoxybenzoate), O-(3,4-dimethoxybenzoate), O-(4-methylbenzoate), and O - (4 - ethylbenzoate) of 7,8-dihydrobenzo[1,2]cyclohepta[3,4,5-d,e]isoquinolyl - 3 - amidoxime are also obtained.

EXAMPLE 4

5-phenyl-3-(7,8-dihydrobenzo[1,2]cyclohepta[3,4,5-d,e]isoquinolyl-3)-1,2,4-oxadiazole 7,8 - dihydrobenzo[1,2]cyclohepta - [3,4,5-e] - isoquinolyl-3-amidoxime-O-benzoate (0.5 g.) is refluxed for 20 hours in 10 ml. xylene with a Dean-Stark apparatus. The organic phase is evaporated to give an oil which is passed through a column of neutral alumina. Evaporation and crystallization from methanol yields the title compound with M.P. 153–156° C., also identified by elemental analysis.

In the same manner, but using the corresponding O-acetate, O-propionate, O-butyrate, O-(4-chlorobenzoate), O-fluorobenzoate), O - (3 - methoxybenzoate), O-(3,4-dimethoxybenzoate), O-(4-methylbenzoate) and O-(4-ethylbenzoate) instead of the O-benzoate as starting materials, 5-methyl-, 5-ethyl-, 5-propyl-, 5-(4-chlorophenyl)-, 5-(4-fluorophenyl)-, 5 - (3 - methoxyphenyl)-, 5-(3,4-dimethoxyphenyl)-, 5-(4-methylphenyl)-, and 5 - (4-ethylphenyl) - 3,7-dihydrobenzo[1,2]cyclohepta [3,4,5-d,e] - isoquinolyl-3) - 1,2,4-oxadiazole are also obtained.

We claim:
1. A compound selected from the group which consists of compounds of the formula

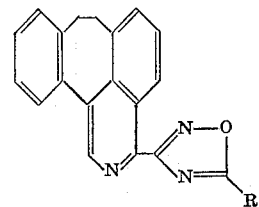

wherein R is a substituent selected from the group which consists of lower alkyl, phenyl, halogen substituted-phenyl, lower alkoxy substituted-phenyl, and lower alkyl substituted-phenyl; and salts thereof with pharmacologically acceptable acids.

2. 5 - phenyl - 3 - (7,8-dihydrobenzo[1,2]cyclohepta[3,4,5-d,e]isoquinolyl-3 - 1,2,4-oxadiazole, as claimed in claim 1.

3. 5 - methyl - 3 - (7,8-dihydrobenzo[1,2]cyclohepta-[3,4,5-d,e]isoquinolyl - 3)-1,2,4-oxadiazole, as claimed in claim 1.

4. 5 - ethyl - 3 - (7,8-dihydrobenzo[1,2]cyclophepta[3,4,5-d,e]isoquinolyl - 3)-1,2,4-oxadiazole, as claimed in claim 1.

5. 5 - propyl - 3 - (7,8-dihydrobenzo[1,2]cyclohepta[3,4,5-d,e]isoquinolyl-3)-1,2,4-oxadiazole, as claimed in claim 1.

6. 5 - (4 - chlorophenyl) - 3-(7,8-dihydrobenzo[1,2]cyclohepta[3,4,5-d,e]isoquinolyl - 3) - 1,2,4 - oxadiazole, as claimed in claim 1.

7. 5 - (4 - fluorophenyl) - 3 - (7,8-dihydrobenzo[1,2]cyclohepta[3,4,5-d,e]isoquinolyl - 3) - 1,2,4 - oxadiazole, as claimed in claim 1.

8. 5 - (3 - methoxyphenyl) - 3-(7,8-dihydrobenzo[1,2]cyclohepta[3,4,5-d,e]isoquinolyl - 3) - 1,2,4 - oxadiazole, as claimed in claim 1.

9. 5 - (3,4 - dimethoxyphenyl) - 3 - (7,8-dihydrobenzo[1,2]cyclohepta[3,4,5-d,e]isoquinolyl - 3) - 1,2,4 - oxadiazole, as claimed in claim 1.

10. 5 - (4 - methylphenyl) - 3-(7,8-dihydrobenzo[1,2]cyclohepta[3,4,5-d,e]isoquinolyl - 3) - 1,2,4 - oxadiazole, as claimed in claim 1.

11. 5 - (4 - ethylphenyl) - 3-(7,8-dihydrobenzo[1,2]cyclohepta[3,4,5-d,e]isoquinolyl - 3) - 1,2,4 - oxadiazole, as claimed in claim 1.

12. Compounds of the formula

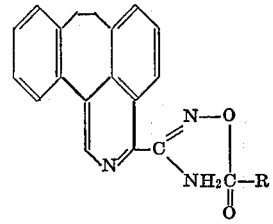

wherein R is a substituent selected from the group which consists of lower alkyl, phenyl, halogen substituted-phenyl, lower alkoxy substituted-phenyl and lower alkyl substituted-phenyl.

13. 7,8 - dihydrobenzo[1,2]cyclohepta - [3,4,5-d,e]isoquinolyl - 3 - amidoxime-O-acetate, as claimed in claim 12.

14. 7,8 - dihydrobenzo[1,2]cyclohepta[3,4,5 - d,e]isoquinolyl - 3 - amidoxime - O - propionate, as claimed in claim 12.

15. 7,8 - dihydrobenzo[1,2]cyclohepta[3,4,5-d,e]isoquinolyl - 3 - amidoxime - O - butyrate, as claimed in claim 12.

16. 7,8 - dihydrobenzo[1,2]cyclohepta - [3,4,5-d,e]isoquinolyl - 3 - amidoxime-O-benzoate, as claimed in claim 12.

17. 7,8 - dihydrobenzo[1,2]cyclohepta-[3,4,5 - d,e]isoquinolyl - 3 - amidoxime - O - (4 - chlorobenzoate), as claimed in claim 12.

18. 7,8 - dihydrobenzo[1,2]cyclohepta - [3,4,5-d,e]isoquinolyl - 3 - amidoxime-O-(4 - fluorobenzoate), as claimed in claim 12.

19. 7,8 - dihydrobenzo[1,2]cyclohepta - [3,4,5-d,e]isoquinolyl - 3 - amidoxime-O-(3 - methoxybenzoate) as claimed in claim 12.

20. 7,8 - dihydrobenzo[1,2]cyclohepta[3,4,5 - d,e]isoquinolyl - 3 - amidoxime-O-(3,4 - dimethoxybenzoate), as claimed in claim 12.

21. 7,8 - dihydrobenzo[1,2]cyclohepta[3,4,5 - d,e]isoquinolyl - 3 - amidoxime-O-(4 - methylbenzoate), as claimed in claim 12.

22. 7,8 - dihydrobenzo[1,2]cyclohepta[3,4,5 - d,e]isoquinolyl - 3 - amidoxime-O-(4 - ethylbenzoate), as claimed in claim 12.

References Cited

UNITED STATES PATENTS

| | | | |
|---|---|---|---|
| 3,245,989 | 4/1966 | Palazzo | 260—307 |
| 3,272,828 | 9/1966 | Von Esch | 260—287 X |
| 3,279,988 | 10/1966 | Buting | 260—307 |
| 3,403,155 | 9/1968 | Humber et al. | 260—283 |
| 3,403,157 | 9/1968 | Humber et al. | 260—287 |

DONALD G. DAUS, Primary Examiner

U.S. Cl. X.R.

260—283, 286, 288, 544; 424—258